United States Patent
Okahara (10) Patent No.: US 8,047,827 B2
(45) Date of Patent: Nov. 1, 2011

(54) MOLD FOR IN-MOLD COATING FORMATION

(75) Inventor: Etsuo Okahara, Ube (JP)

(73) Assignee: Ube Machinery Corporation, Ltd., Ube-shi (JP)

(*) Notice: Subject to any disclaimer, the term of this patent is extended or adjusted under 35 U.S.C. 154(b) by 0 days.

(21) Appl. No.: 12/450,371

(22) PCT Filed: Mar. 28, 2008

(86) PCT No.: PCT/JP2008/056121
§ 371 (c)(1),
(2), (4) Date: Sep. 23, 2009

(87) PCT Pub. No.: WO2008/120729
PCT Pub. Date: Oct. 9, 2008

(65) Prior Publication Data
US 2010/0040726 A1 Feb. 18, 2010

(30) Foreign Application Priority Data
Mar. 29, 2007 (JP) .................................. 2007-089268

(51) Int. Cl.
*B29C 45/18* (2006.01)
*B29C 45/37* (2006.01)

(52) U.S. Cl. ................ 425/112; 264/255; 264/328.7; 264/328.8; 425/120; 425/130; 425/573

(58) Field of Classification Search ............ 264/255, 264/328.7, 328.8; 425/112, 120, 130, 544, 425/570, 573, 595, DIG. 47
See application file for complete search history.

(56) References Cited

U.S. PATENT DOCUMENTS
3,608,004 A * 9/1971 Borisuck et al. ............. 264/244
4,076,788 A * 2/1978 Ditto ............................ 264/255
(Continued)

FOREIGN PATENT DOCUMENTS
JP 2001-138334 A 5/2001
(Continued)

OTHER PUBLICATIONS
International Search Report mailed May 27, 2008, issued on PCT/JP2008/056121.

*Primary Examiner* — Yogendra Gupta
*Assistant Examiner* — Emmanuel S Luk
(74) *Attorney, Agent, or Firm* — Edwards Angell Palmer & Dodge LLP (57) ABSTRACT

The mold for in-mold coating formation is one including a mold main body 30 having, provided thereinside, a mold cavity 5 permitting injection molding of a resin molding with coated surface and a coating material injecting unit 50 capable of injecting a coating material to an area corresponding to the coated surface of the resin molding, within the mold cavity 5, in which a groove portion 3 of 0.3 to 1 mm width (W) is provided on the peripheral edge 15 of the mold, and in which the angle ($\theta_1$) made by the inner circumferential surface 25 of the mold and the mold-opening-side internal wall surface 27 of the groove portion 3 is in the range of 30° to 70°.

12 Claims, 8 Drawing Sheets

U.S. PATENT DOCUMENTS

| | | | |
|---|---|---|---|
| 4,783,298 A * | 11/1988 | Oda | 264/155 |
| 6,432,350 B1 * | 8/2002 | Seres et al. | 264/500 |
| 6,884,056 B2 * | 4/2005 | Thompson | 425/130 |
| 7,309,221 B2 | 12/2007 | Okahara et al. | |
| 7,832,999 B2 * | 11/2010 | Yonemochi et al. | 425/130 |
| 2003/0218272 A1 * | 11/2003 | Sekito et al. | 264/255 |
| 2004/0201132 A1 | 10/2004 | Okahara et al. | |
| 2005/0116384 A1 * | 6/2005 | Hyuga et al. | 264/255 |
| 2005/0285303 A1 * | 12/2005 | Balint et al. | 264/255 |
| 2006/0076712 A1 | 4/2006 | Yonemochi et al. | |
| 2009/0121385 A1 | 5/2009 | Yonemochi et al. | |

FOREIGN PATENT DOCUMENTS

| | | |
|---|---|---|
| JP | 3843833 | 7/2003 |
| JP | 2005-161683 A | 6/2005 |
| WO | WO-03/009985 A1 | 2/2003 |

* cited by examiner

MOLD FOR IN-MOLD COATING FORMATION

TECHNICAL FIELD

The present invention relates to a mold for in-mold coating formation used for in-mold coating formation for applying in-mold coating of coating material to a surface of resin molding.

BACKGROUND ART

Hitherto, a decorative coating method has been often employed as a method for increasing the variety of decorations on resin molding made of a thermoplastic resin. Generally, according to a conventional coating methods, molding formed through injection molding in a mold is removed from the mold and then the molding is applied a coating material onto a surface of the molding by means of a spraying method, an immersion method, or the like. The coating material applied onto the surface of the molding is subsequently dried and thus turned into a hard coating material film (coating film) to coat the surface of the molding and decorate and protect the surface of the molding.

In recent years, however, proposed is an in-mold coating formation method (also called an in-mold coating method) which performs resin molding and application of a coating material in the same mold for the purpose of reducing the number of steps in the coating method. According to the in-mold coating formation method, after injection molding of a rein in a mold, the mold is slightly opened to form a space between resin molding formed in the mold and a mold cavity surface. Then, a coating material is injected into the space using a coating material injecting unit, after which the mold is clamped again to thereby uniformly spread the coating material over the molding surface. After that, the coating material is hardened and the molding is coated.

According to the in-mold coating formation method, since a thermoplastic resin is molded and coated in the same mold, a cost can be saved because of a simplified process and in addition, any failure rarely occurs due to adhesion of dust in the air to a pre-hardened coating material, and a high-quality product can be provided. Thus, there has been considered the application of the in-mold coating formation method to especially production of many components for use in automobiles such as a bumper, a door mirror cover, and a fender, which require a high-quality appearance.

Many in-mold coating formation methods use a mold having an engagement portion (hereinafter also referred to as a "landed portion") of a landed structure (shore edge structure) formed around the entire circumference of a mold cavity to prevent leakage of a coating material. In practice, however, there is a problem that the leakage of a coating material from the mold cavity cannot be completely prevented by the landed portion alone.

To overcome such a problem, a mold for in-mold coating formation has been proposed. The mold has an auxiliary cavity around the entire circumference of a mold cavity and the auxiliary cavity is filled with a resin to prevent leakage of a coating material (for example, see Patent Document 1). This mold for in-mold coating formation has an advantage that the coating material rarely leaks even if the landed portion is worn out.

[Patent Document 1]
JP 2001-138334 A
[Patent Document 2]
JP 3843833 B

DISCLOSURE OF INVENTION

Figure 6:
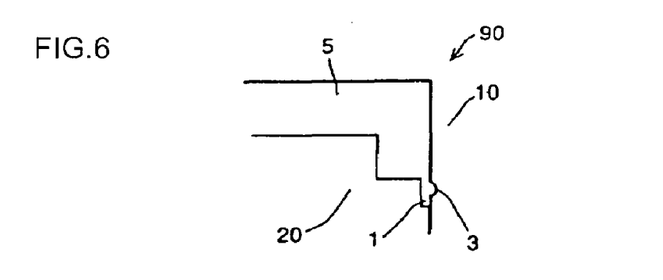
FIG. 6 is a schematic diagram illustrating an auxiliary cavity of a conventional mold for in-mold coating formation.

However, in the case of using the mold for in-mold coating formation proposed in Patent Document 1, a coating material sometimes leaks due to shrinkage of the resin filled into the auxiliary cavity. To solve such a problem, a mold for in-mold coating formation 90 as shown in FIG. 6 has been proposed, which has a groove portion 3 formed around the entire circumference of an auxiliary cavity 1 on a coated surface side of a mold constituting the auxiliary cavity 1 (see Patent Document 2, for example). By using the mold for in-mold coating formation 90, leakage is less likely to occur even if a resin filled into the auxiliary cavity 1 shrinks, and stable in-mold coating formation is secured over a long period.

However, resin molding formed using the mold for in-mold coating formation disclosed in Patent Document 2 involves an unnecessary molding portion corresponding to the auxiliary cavity. Therefore, after the removal of the resin molding from the mold, the unnecessary molding portion should be removed through a cutting process or the like. This requires a large-scale device or work for the cutting process or the like. In addition, grinding dust sometimes adheres to resin molding formed through the cutting process or the like. In particular, there is a problem that, if the grinding dust adheres to the back side of a transparent component, the dust cannot be easily removed after the component is integrated.

The present invention has been accomplished in view of the above problems in the conventional techniques. It is an object of the present invention to provide a mold for in-mold coating formation that realizes effective prevention of coating material leakage over a prolonged period of time and, without the need of extensive post-processing, easy production of a resin molding of high quality.

The present inventors have made extensive studies with a view to achieving the above object and then found that the above object can be attained by forming a groove portion of a special shape at a peripheral edge of the mold main body corresponding to the coated surface side of resin molding, and accomplished the present invention.

To elaborate, the present invention provides the following mold for in-mold coating formation.

[1] A mold for in-mold coating formation (hereinafter also referred to as a "first mold for in-mold coating formation), comprising: a mold main body including a male mold and a female mold which are clamped with each other with a mold cavity being formed therein to allow formation of resin molding having a coated surface by means of injection molding; and a coating material injecting unit capable of injecting a coating material to an area corresponding to the coated surface of the resin molding, within the mold cavity, wherein a groove portion of 0.3 to 1 mm width (W) is formed at a peripheral edge of the mold main body corresponding to the coated surface side of the resin molding, and wherein an angle ($\theta_1$) made by an inner circumferential surface of the mold main body and a mold-opening-side internal wall surface of the groove portion is in a range of 30° to 70°.

[2] The mold for in-mold coating formation according to [1], wherein a depth (D) of the groove portion is in a range of 0.3 to 1 mm.

[3] The mold for in-mold coating formation according to [1] or [2], wherein an angle ($\theta_2$) made by an inner circumferential surface of the mold main body and a mold-closing-side internal wall surface of the groove portion is in a range of 30° to 150°.

[4] A mold for in-mold coating formation (hereinafter also referred to as a "second mold for in-mold coating formation), comprising: a mold main body including a male mold and a female mold which are clamped with each other with a mold cavity being formed therein to allow formation of resin molding having a coated surface by means of injection molding; and a coating material injecting unit capable of injecting a coating material to an area corresponding to the coated surface of the resin molding, within the mold cavity, wherein a groove portion of 0.3 to 1 mm width (W) is formed at a peripheral edge of the mold main body corresponding to the coated surface side of the resin molding, and wherein a border portion between an inner circumferential surface of the mold main body and a mold-opening-side internal wall surface of the groove portion has an R-shaped form having a curvature radius (r) of 0.2 to 1 mm.

[5] The mold for in-mold coating formation according to [4], wherein a depth (D) of the groove portion is in a range of 0.3 to 1 mm.

[6] The mold for in-mold coating formation according to [4] or [5], wherein an angle ($\theta_2$) made by an inner circumferential surface of the mold main body and a mold-closing-side internal wall surface of the groove portion is in a range of 30° to 90°.

[7] The mold for in-mold coating formation according to any one of [1] to [6], wherein the mold main body further includes a mold for groove portion formation, and wherein the groove portion is formed by assembling the male mold and/or the female mold with the mold for groove portion formation.

[8] The mold for in-mold coating formation according to any one of claims 1 to 6, wherein the groove portion is formed in the male mold or the female mold.

The first and second molds for in-mold coating formation according to the present invention have an effect of realizing effective prevention of coating material leakage over a prolonged period of time and, without the need of extensive post-processing, easy production of a resin molding of high quality.

| Reference Numerals | |
|---|---|
| 1 | auxiliary cavity |
| 3, 13 | groove portion |
| 4 | projection |
| 5 | mold cavity |
| 8 | gate |
| 10 | movable mold |
| 11 | female mold |
| 15, A, B | mold peripheral edge |
| 20 | stationary mold |
| 21 | male mold |
| 22 | mold-closing-side internal wall surface |
| 25 | inner circumferential surface |
| 27 | mold-opening-side internal wall surface |
| 30 | mold main body |
| 31 | mold for groove portion formation |
| 33 | thermoplastic resin |
| 35 | coating material |
| 50 | coating material injecting unit |
| 51 | coating material injection port |
| 90, 100 | mold for in-mold coating formation |

-continued

| | Reference Numerals |
|---|---|
| W | width of groove portion |
| D | depth of groove portion |

BEST MODES FOR CARRYING OUT THE INVENTION

Hereinafter, best modes for carrying out the present invention will be described. However, it should be understood that the present invention is not limited to the following embodiment but encompasses modifications and improvements of the following embodiment, which are made based on general knowledge of those skilled in the art without departing from the scope of the present invention.

Figure 1:
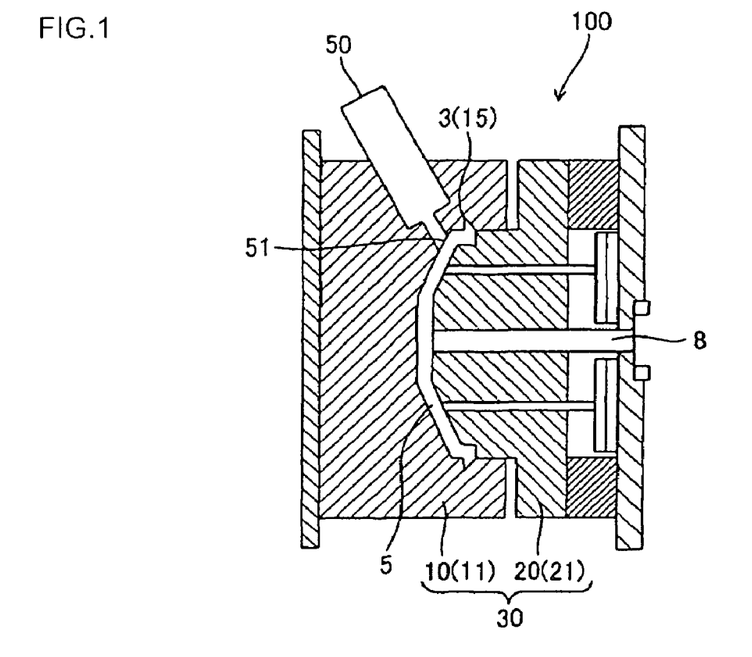
FIG. 1 is a sectional view of a first mold for in-mold coating formation according to an embodiment of the present invention.

FIG. 1 is a sectional view of a first mold for in-mold coating formation according to an embodiment of the present invention. As shown in FIG. 1, a mold for in-mold coating formation 100 of this embodiment includes a mold main body 30 including a movable mold 10 and a stationary mold 20, and a coating material injecting unit 50. In the mold for in-mold coating formation 100, the movable mold 10 corresponds to a female mold 11, and the stationary mold 20 corresponds to a male mold 21. The stationary mold 20 and the movable mold 10 are engaged at an engagement portion of the "landed structure". The stationary mold 20 and the movable mold 10 are clamped to thereby form a mold cavity 5 that allows formation of resin molding through injection molding. In FIG. 1, reference numeral 8 denotes a gate through which a resin flows when being injected into the mold cavity 5.

The coating material injecting unit 50 (injector) is provided on the movable mold 10 and designed to allow injection of a coating material into the mold cavity 5 from a coating material injection port 51. Further, a not-shown valve is disposed at the coating material injection port 51 of the coating material injecting unit 50. The valve is closed upon injection molding of a material. Thus, the valve prevents a resin injected into the mold cavity 5 of the mold main body 30 from intruding into the coating material injecting unit 50 from the coating material injection port 51.

Further, the coating material injecting unit 50 can be driven by a not-shown driving unit and is designed to accurately inject a coating material supplied thereinto to an inner portion of the mold cavity 5 corresponding to a coated surface of resin molding by a predetermined amount. The coating material injecting unit 50 shown in FIG. 1 is structured to inject a coating material on the movable mold 10 side, but the structure is not limited thereto. The unit only needs to inject a coating material into a space formed between resin molding formed within the mold cavity 5 and the internal wall surface of the mold cavity 5. Thus, the coating material injecting unit 50 may be provided on the stationary mold 20. Further, plural coating material injecting units may be disposed on one mold for in-mold coating formation.

A groove portion 3 is formed around the entire circumference of the mold cavity 5 at a peripheral edge (mold peripheral edge 15) of the movable mold 10 (female mold 11) of the mold for in-mold coating formation 100 of this embodiment corresponding to a coated surface side of resin molding. By forming the groove portion 3 around the entire circumference of the mold cavity 5, a resin injected and filled into the mold cavity 5 also fills the groove portion 3.

Figure 7A:
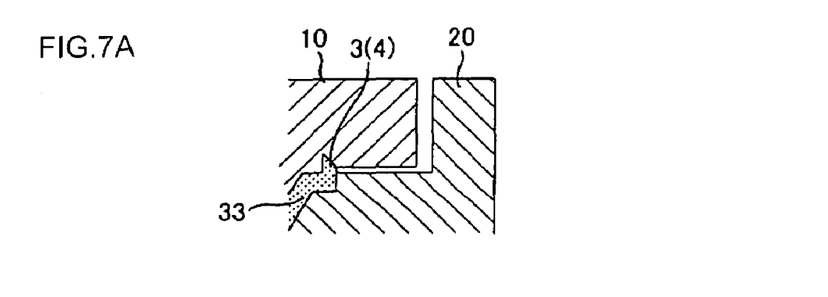
FIG. 7A is a conceptual view illustrating a behavior when leakage of a coating material is prevented by a projection defined by a groove portion of the mold for in-mold coating formation according to the present invention.

Referring next to FIG. 1 and FIGS. 7A to 7C, an in-mold coating formation method using the mold for in-mold coating formation 100 is described in detail. First, the mold main body 30 is clamped by means of a clamping unit for a not-shown injection molding device. Subsequently, a thermoplastic resin 33, a material, is injected into the mold cavity 5. The material is cooled to some degree (down to such a level as causes no deformation of resin molding when the metal main body is opened) (FIG. 7A). FIG. 7A shows a state in which the thermoplastic resin 33 is injected to the mold cavity 5 and the groove portion 3 and solidified.

Figure 7B:
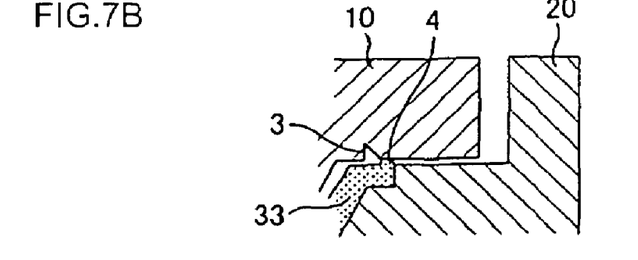
FIG. 7B is a conceptual view illustrating a behavior when leakage of a coating material is prevented by a projection defined by a groove portion of the mold for in-mold coating formation according to the present invention.

After the material has been cooled, the mold main body 30 is slightly opened as shown in FIG. 7B (slightly-opened mold state that, for example, the movable mold 10 is moved by about 1 mm in the mold-opening direction (leftward in the figure)) to secure a space between resin molding formed in the mold cavity 5 and the internal wall surface of the movable mold 10, in which a coating material is injected. If the mold main body 30 is slightly opened, a projection 4 formed by the thermoplastic resin filled into the groove portion 3 comes off from the groove portion 3 and moves a little within the mold main body 30. The thermoplastic resin filled into the mold cavity 5 solidifies and shrinks, resulting in formation of a small space between the solidified thermoplastic resin and the internal wall surface of the mold cavity 5. However, the formed space is filled by the projection 4 moving in the mold main body 30 after coming off from the groove portion 3 while being pushed down.

Figure 7C:
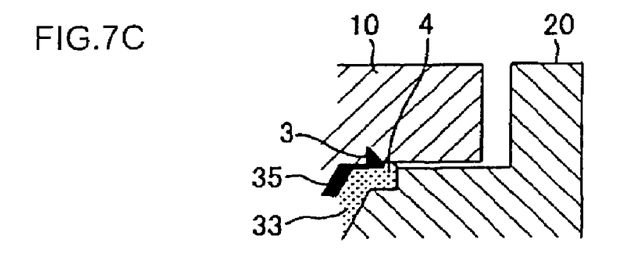
FIG. 7C is a conceptual view illustrating a behavior when leakage of a coating material is prevented by a projection defined by a groove portion of the mold for in-mold coating formation according to the present invention.

Next, as shown in FIG. 7C, a coating material 35 is injected into a space for injection of coating material by means of the coating material injecting unit 50. Here, it is preferred to use the coating material 35 having thermosetting property because the resin can be easily hardened at preset mold temperature. After that, the movable mold 10 is moved toward the stationary mold 20 (mold-closing direction), and the mold main body 30 is closed again and clamped to thereby allow the coating material 35 to flow in the space under pressure and to spread throughout the mold cavity 5 while being pressured. In the case of performing coating formation with the mold for in-mold coating formation 100 of this embodiment, as shown in FIG. 7C, the projection 4 formed by the resin filled into the groove portion 3 moves inside the mold main body 30 to seal a space to which the coating material 35 leaks. This gives a solution to a problem about coating material leakage.

The coating material spreads throughout the mold cavity 5 as well as hardens under pressure through the above process. If the mold main body 30 is opened after the coating material 35 has hardened, resin molding can be taken off. In the mold for in-mold coating formation of this embodiment, the groove portion is formed into a predetermined shape. Thus, the formed projection easily comes off from the groove portion without being cut, and coating material leakage can be more effectively prevented. In addition, since the auxiliary cavity in the mold for in-mold coating formation disclosed in Patent Document 2 or the like can be omitted, it is unnecessary to remove an unnecessary molding portion through a cutting process or the like after the resin molding is taken off from the mold main body.

Figure 2:
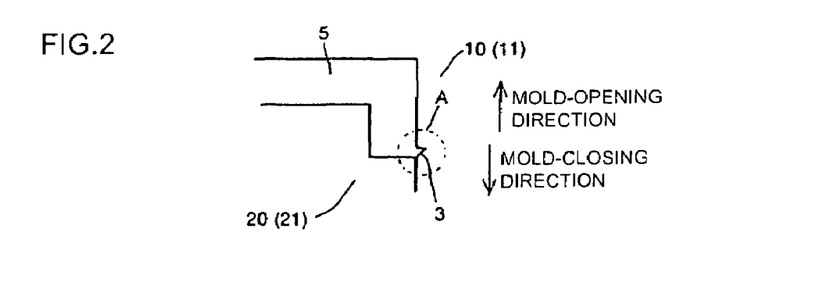
FIG. 2 is a schematic diagram illustrating a shape of a groove portion of the first mold for in-mold coating formation according to the present invention.
Figure 3:
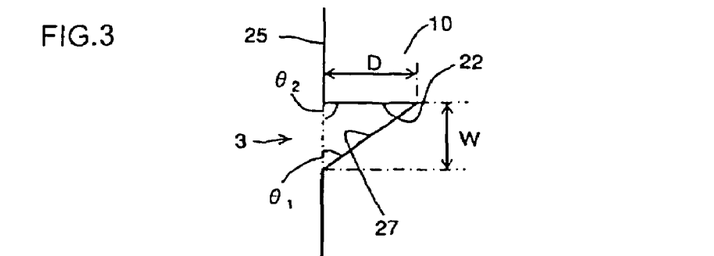
FIG. 3 is an enlarged view of a mold peripheral edge A in FIG. 2.

Referring next to FIGS. 2 and 3, a shape of the groove portion in the first mold for in-mold coating formation according to the present invention is described in detail. The width (W) of the groove portion 3 of the first mold for in-mold coating formation of this embodiment is in the range of 0.3 to 1 mm, preferably in the range of 0.3 to 0.7 mm, and more preferably in the range of 0.3 to 0.5 mm. If the width (W) of the groove portion 3 is smaller than 0.3 mm, the thermoplastic resin cannot be sufficiently filled into the groove portion 3, and leakage of the coating material cannot be completely prevented in some cases. On the other hand, if the width (W)

of the groove portion 3 exceeds 1 mm, a large projection remains on the resultant resin molding. Such an obstructive projection is undesirable from the viewpoint of practical use.

The depth (D) of the groove portion 3 is preferably in the range of 0.3 to 1 mm, more preferably in the range of 0.3 to 0.7 mm, and further preferably in the range of 0.4 to 0.6 mm. If the depth (D) of the groove portion 3 is smaller than 0.3 mm, leakage of the coating material cannot be completely prevented in some cases. On the other hand, if the depth (D) of the groove portion 3 exceeds 1 mm, a formed projection is too large to come off from the groove portion 3 at the time of opening the mold. As a result, the projection might be cut, for example, making it difficult to completely prevent leakage of the coating material in some cases. Here, a desired effect can be attained as long as the width (W) of the groove portion 3 is 0.3 mm or more even if the depth (D) of the groove portion 3 is smaller than 0.3 mm.

The angle ($\theta_1$) made by an inner circumferential surface 25 of the mold and a mold-opening-side internal wall surface 27 of the groove portion 3 is in the range of 30° to 70°, preferably in the range of 35° to 60°, and more preferably in the range of 40° to 50°. If $\theta_1$ is smaller than 30°, the entire projection cannot come off from the groove portion 3 unless the mold main body is largely opened, and the coating material leakage cannot be completely prevented. On the other hand, if $\theta_1$ exceeds 70°, the projection might be cut when coming off from the groove portion 3, and coating material leakage cannot be completely prevented. Hence, if $\theta_1$ falls within the above range, the projection is rarely cut and the coating material leakage can be effectively prevented.

Further, the angle ($\theta_2$) made by the inner circumferential surface 25 of the mold and a mold-closing-side internal wall surface 22 of the groove portion 3 is in the range of 30° to 150°. If $\theta_2$ falls within the above numerical range, the coating material leakage can be effectively prevented. In FIGS. 2 and 3, the groove portion 3 has a rectangular triangle sectional shape. However, the sectional shape of the groove portion in the first mold for in-mold coating formation of the present invention is not limited to the shape shown in FIGS. 2 and 3 insofar as the above values W, D, and $\theta_1$ fall within the above numerical range. Accordingly, the groove portion may have a trapezoidal shape in section, and the deepest portion of the groove portion may not have an acute-angled shape. FIGS. 19 to 23 show conceivable examples of the shape of the groove portion.

Figure 4:
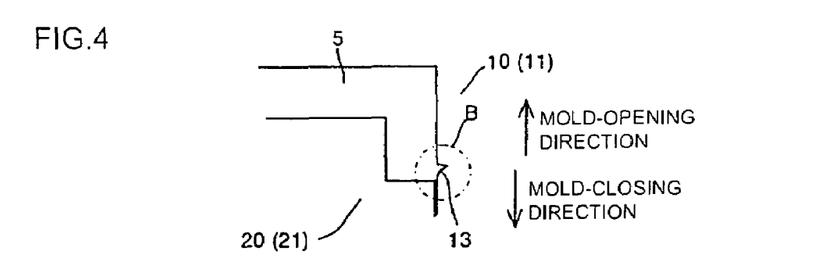
FIG. 4 is a schematic diagram illustrating a shape of a groove portion of a second mold for in-mold coating formation according to the present invention.
Figure 5:
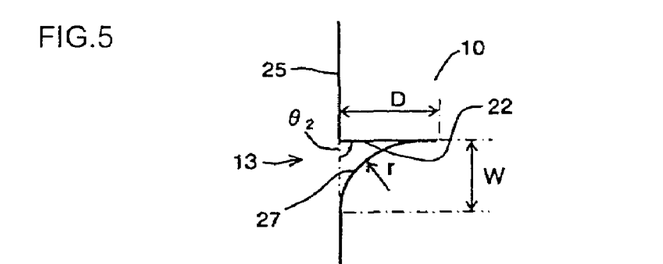
FIG. 5 is an enlarged view of a mold peripheral edge B in FIG. 4.

Referring next to FIGS. 4 and 5, the shape of a groove portion in a second mold for in-mold coating formation of the present invention is described in detail. The width (W) of a groove portion 13 of the second mold for in-mold coating formation of this embodiment is in the range of 0.3 to 1 mm, preferably in the range of 0.3 to 0.7 mm, and more preferably in the range of 0.3 to 0.5 mm. If the width (W) of the groove portion 3 is smaller than 0.3 mm, the thermoplastic resin cannot be sufficiently filled into the groove portion 13, and leakage of the coating material cannot be completely prevented in some cases. On the other hand, if the width (W) of the groove portion 13 exceeds 1 mm, a large projection remains on the resultant resin molding. Such an obstructive projection is undesirable from the viewpoint of practical use.

The depth (D) of the groove portion 3 is preferably in the range of 0.3 to 1 mm, more preferably in the range of 0.3 to 0.7 mm, and further preferably in the range of 0.4 to 0.6 mm. If the depth (D) of the groove portion 13 is smaller than 0.3 mm, leakage of the coating material cannot be completely prevented in some cases. On the other hand, if the depth (D) of the groove portion 13 exceeds 1 mm, a formed projection is too large to come off from the groove portion 13 at the time of opening the mold. As a result, the projection might be cut, for example, making it difficult to completely prevent leakage of the coating material in some cases. Here, a desired effect can be attained as long as the width (W) of the groove portion 3 is 0.3 mm or more even if the depth (D) of the groove portion 3 is smaller than 0.3 mm.

Further, the angle ($\theta_2$) made by the inner circumferential surface 25 of the mold and the mold-closing-side internal wall surface 22 of the groove portion 13 is preferably in the range of 30° to 90°. If $\theta_2$ falls within the above numerical range, the coating material leakage can be effectively prevented.

Further, a border portion between the inner circumferential surface 25 of the mold and the mold-opening-side internal wall surface 27 of the groove portion 13 has an R-shaped form having a curvature radius (r) of 0.2 to 1 mm, preferably 0.3 to 0.7 mm, and more preferably 0.4 to 0.5 mm. By forming the border portion between the inner circumferential surface 25 of the mold and the mold-opening-side internal wall surface 27 of the groove portion 13 into the R shape, the projection is rarely cut and the coating material leakage can be effectively prevented similar to the aforementioned first mold for in-mold coating formation. In FIGS. 4 and 5, the deepest portion of the groove portion 13 has an acute-angled shape. However, the sectional shape of the groove portion in the second mold for in-mold coating formation of the present invention is not limited to the shape shown in FIGS. 4 and 5 insofar as the above values W, D, and r fall within the above numerical range. Accordingly, the deepest portion of the groove portion may not take an acute-angled shape but may be formed with a certain width.

Figures 8, 9:
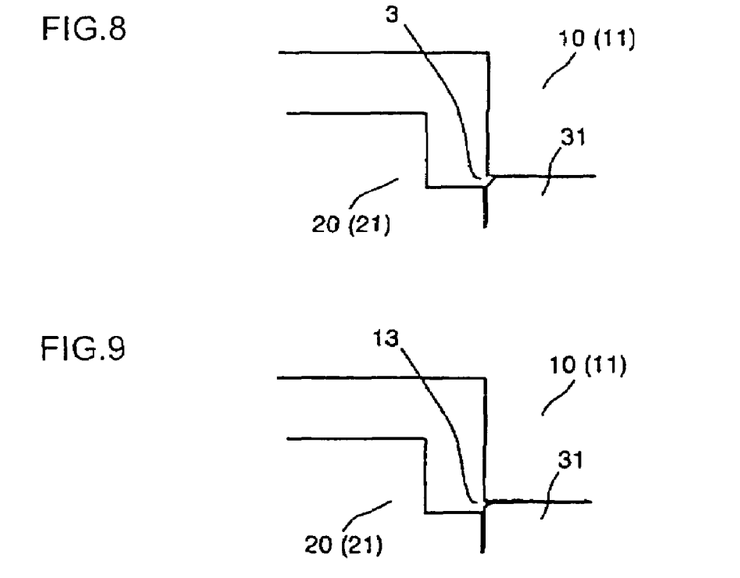
FIG. 8 is a schematic diagram of an example of formation of a groove portion with a mold for groove portion formation.
FIG. 9 is a schematic diagram of another example of formation of a groove portion with a mold for groove portion formation.

The groove portion in the mold for in-mold coating formation of this embodiment may be formed in either the male mold or the female mold. Note that as shown in FIGS. 8 and 9, the mold main body includes the mold for groove portion formation 31 as well as the male mold 21 and the female mold 11. To give another preferable form, the mold main body is designed such that the mold for groove portion formation 31 and the male mold 21 and/or the female mold 11 are assembled to form the groove portion 3, 13. Forming the groove portion 3, 13 by use of the mold for groove portion formation 31 produces advantages that an operation for directly processing the male mold or the female mold to form a groove portion can be simplified and in addition, the degree of freedom of the shape of the groove portion increases, and design constraints on the mold main body or resin molding can be eased.

EXAMPLES

Hereinafter, the present invention will be illustrated in detail based on examples but should not be construed as being limited to those examples.

Example 1

Figure 10:
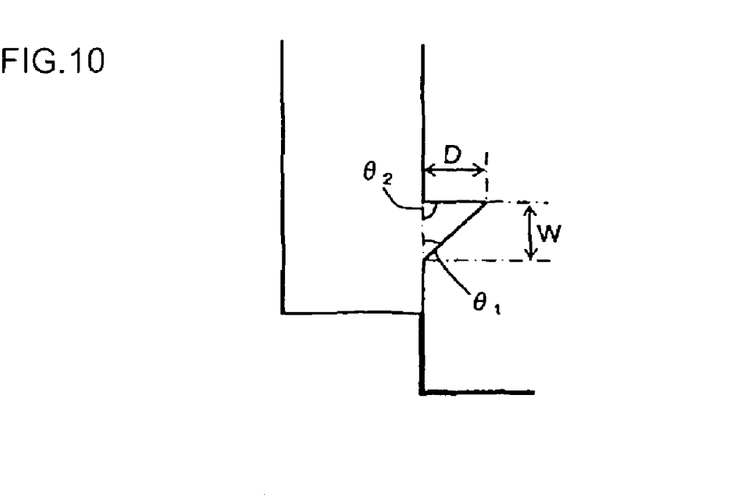
FIG. 10 is a schematic diagram of a shape of a groove portion of a mold for in-mold coating formation according to Example 1.

In-mold coating formation was performed using a disk-like mold having the diameter of 200 mm and the thickness of 3 mm with a groove portion formed under the conditions that W=0.5 mm, D=0.5 mm, $\theta_1$=45°, and $\theta_2$=90° shown in FIG. 10. Here, an ABS resin (trade name of "UT20B", available from Ube Cycon Ltd.) was used as a thermoplastic resin, a material. A coating material of component composition shown in Table 1 was used. Further, a mold-opening amount was set to 0.2 mm upon injection of the coating material. An internal pressure of the mold filled with the coating material was changed, and the maximum pressure (MPa) that causes no leakage of the coating material was determined by measurement. The measurement results of the maximum pressure (Mpa) are shown in Table 2.

Examples 2 and 3

Figure 11:
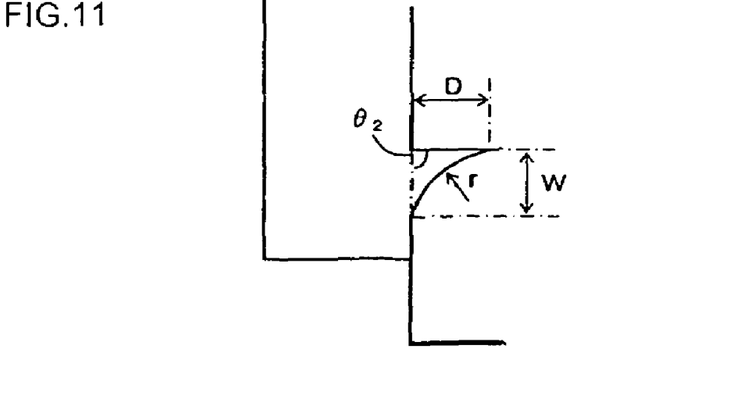
FIG. 11 is a schematic diagram of a shape of a groove portion of a mold for in-mold coating formation according to Example 2.
Figure 12:
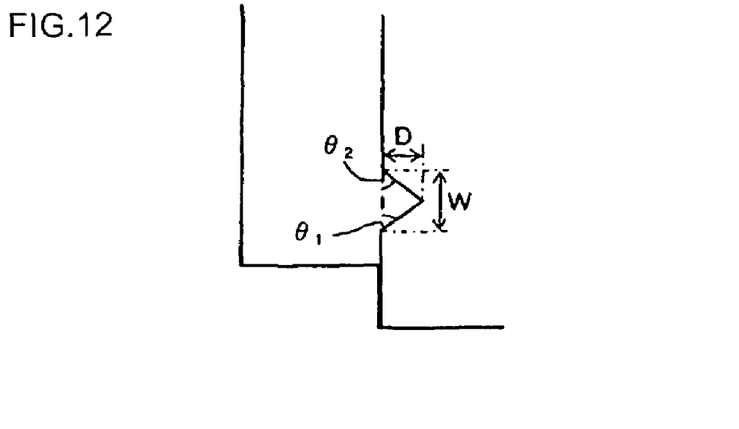
FIG. 12 is a schematic diagram of a shape of a groove portion of a mold for in-mold coating formation according to Example 3.

In-mold coating formation was performed in the same manner as Example 1 above except that a mold having the groove portion shaped as shown in FIGS. 11 and 12 was used. The maximum pressure (MPa) that causes no leakage of the coating material was determined by measurement. The curvature radius (r) of the groove portion in FIG. 11 is 0.5 mm. The measurement results of the maximum pressure (Mpa) are shown in Table 2.

Comparative Examples 1 to 6

In-mold coating formation was performed in the same manner as Example 1 above except that a mold having the groove portion shaped as shown in FIGS. 12 to 18 was used. The maximum pressure (MPa) that causes no leakage of the coating material was determined by measurement. The measurement results of the maximum pressure (Mpa) are shown in Table 2.

TABLE 1

| Component Name | Mass % |
| --- | --- |
| Urethane acrylate oligomer (NW = 2500) | 16.0 |
| Epoxy acrylate oligomer (NW = 540) | 16.0 |
| Styrene | 22.0 |
| Zinc stearate | 0.3 |
| Titanium oxide | 44.0 |
| Carbon black | 0.1 |
| 8% Cobalt Octoate | 0.6 |
| Tert-butyl peroxy-2-ethylhexanoate | 1.0 |

TABLE 2

Figure 13:
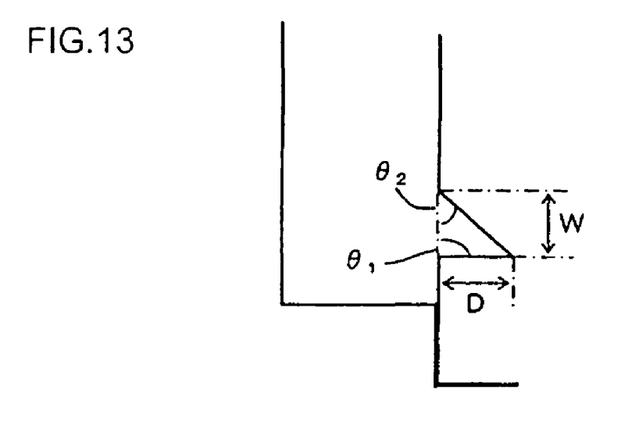
FIG. 13 is a schematic diagram of a shape of a groove portion of a mold for in-mold coating formation according to Comparative Example 1.
Figure 14:
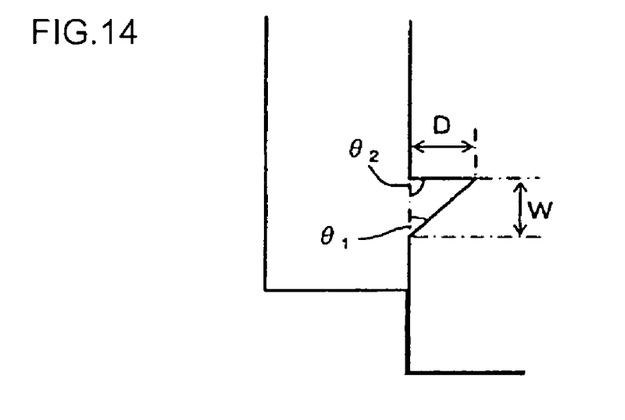
FIG. 14 is a schematic diagram of a shape of a groove portion of a mold for in-mold coating formation according to Comparative Example 2.
Figure 15:
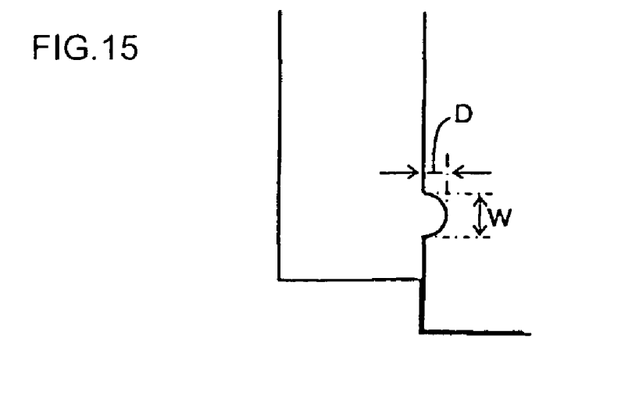
FIG. 15 is a schematic diagram of a shape of a groove portion of a mold for in-mold coating formation according to Comparative Example 3.
Figure 16:
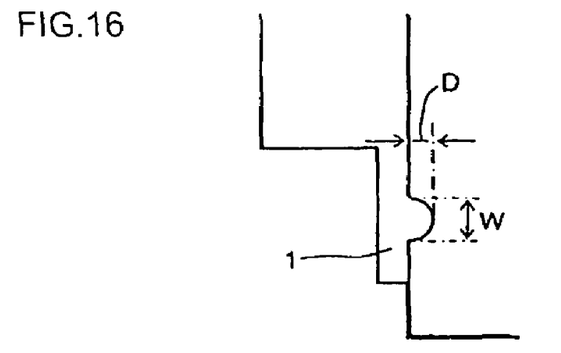
FIG. 16 is a schematic diagram of a shape of a groove portion of a mold for in-mold coating formation according to Comparative Example 4.
Figure 17:
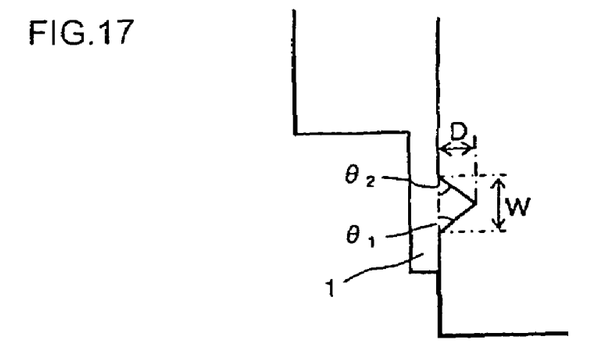
FIG. 17 is a schematic diagram of a shape of a groove portion of a mold for in-mold coating formation according to Comparative Example 5.
Figure 18:
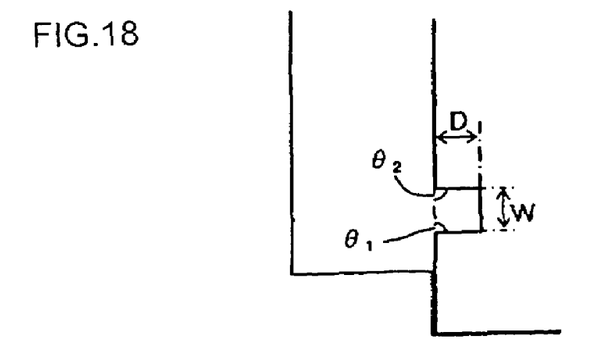
FIG. 18 is a schematic diagram of a shape of a groove portion of a mold for in-mold coating formation according to Comparative Example 6.
Figure 19:
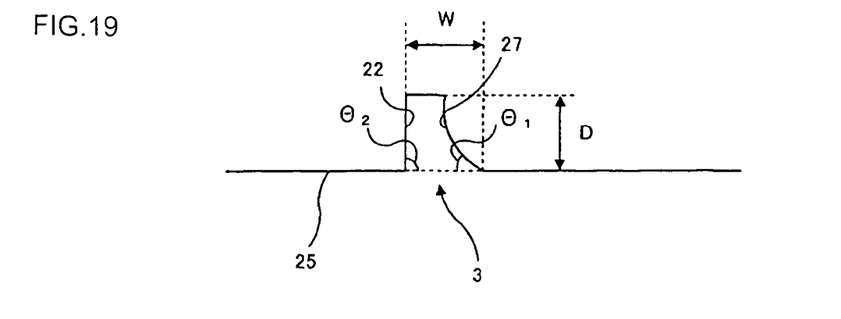
FIG. 19 is a schematic diagram of another example of a shape of a groove portion of the mold for in-mold coating formation according to the present invention.
Figure 20:
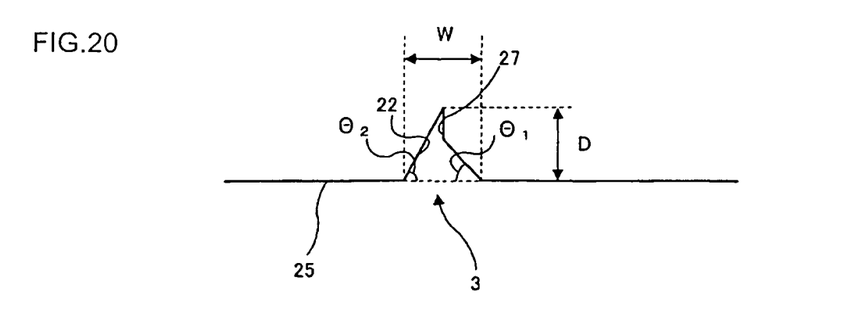
FIG. 20 is a schematic diagram of another example of a shape of a groove portion of the mold for in-mold coating formation according to the present invention.
Figure 21:
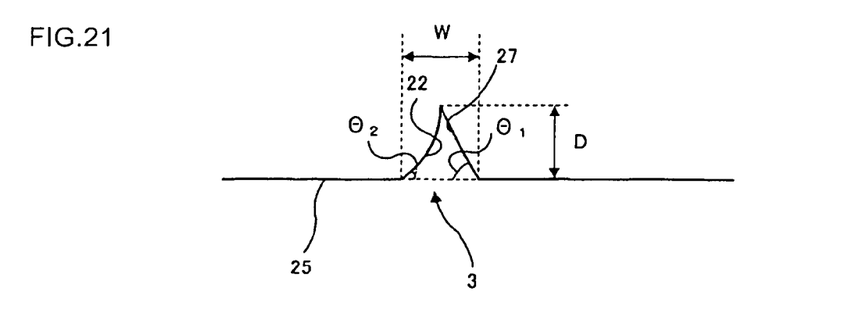
FIG. 21 is a schematic diagram of another example of a shape of a groove portion of the mold for in-mold coating formation according to the present invention.
Figure 22:
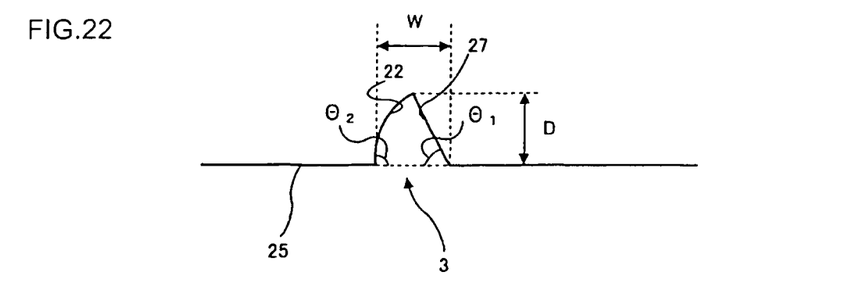
FIG. 22 is a schematic diagram of another example of a shape of a groove portion of the mold for in-mold coating formation according to the present invention.
Figure 23:
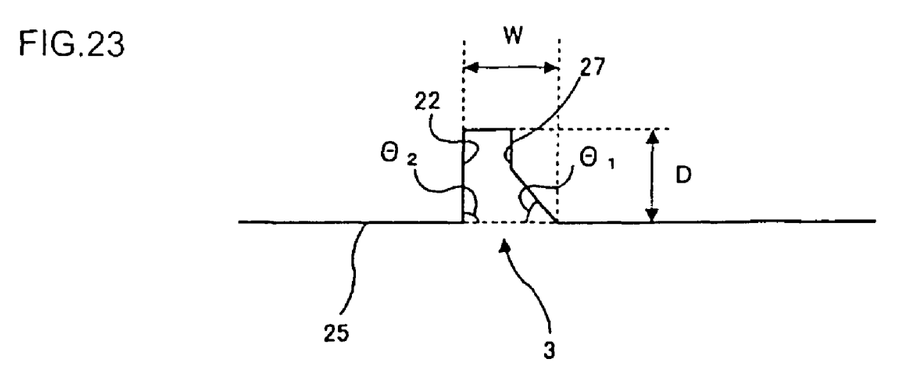
FIG. 23 is a schematic diagram of another example of a shape of a groove portion of the mold for in-mold coating formation according to the present invention.

| | Example | | | Comparative Example | | | | | |
| --- | --- | --- | --- | --- | --- | --- | --- | --- | --- |
| | 1 | 2 | 3 | 1 | 2 | 3 | 4 | 5 | 6 |
| groove shape | FIG. 10 | FIG. 11 | FIG. 12 | FIG. 13 | FIG. 14 | FIG. 15 | FIG. 16 | FIG. 17 | FIG. 18 |
| W (mm) | 0.5 | 0.5 | 0.35 | 0.5 | 0.2 | 0.4 | 0.4 | 0.35 | 0.5 |
| D (mm) | 0.5 | 0.5 | 0.3 | 0.5 | 0.2 | 0.2 | 0.2 | 0.3 | 0.5 |
| $\theta_1$ (°) | 45 | — | 60 | 90 | 45 | — | — | 60 | 90 |
| $\theta_2$ (°) | 90 | 90 | 60 | 45 | 90 | — | — | 60 | 90 |
| Use of auxiliary cavity | Unused | Unused | Unused | Unused | Unused | Unused | Used | Used | Used |
| Maximum pressure (Mpa) | 30 | 30 | 15-16 | 3 | 5 | 6 | 20 | 30 | 3 |

As apparent from Table 2, in the case of using the mold for in-mold coating formation according to Examples 1 to 3, the maximum pressure (MPa) that causes no leakage of the coating material is higher than those in Comparative Examples 1 to 3 and 6. As also apparent from the table, in the case of using the mold for in-mold coating formation of Comparative Examples 4 and 5, the maximum pressure is higher than those in the mold for in-mold coating formation of the other comparative examples. However, the mold for in-mold coating formation of Comparative Examples 4 and 5 includes the auxiliary cavity 1 (see FIGS. 16 and 17), the resultant resin molding involves an unnecessary molding portion due to the auxiliary cavity 1. As a result, the unnecessary molding portion needs to be cut after the molding is taken off from the mold unlike the resin molding formed using the mold for in-mold coating formation of Examples 1 to 3.

INDUSTRIAL APPLICABILITY

The mold for in-mold coating formation of the present invention is particularly applicable to production of components for use in automobiles (for example, a bumper, a door mirror cover, and a fender) which require a high-quality appearance.

The invention claimed is:

1. A mold for in-mold coating formation, comprising:
   a mold main body including a male mold and a female mold, both of which having no auxiliary cavity with a largest dimension extending in a mold closing direction and formed around a circumference thereof, which are clamped with each other with a mold cavity being formed therein to allow formation of a resin molding having a coated surface by means of injection molding; and
   a coating material injecting unit capable of injecting a coating material to an area corresponding to the coated surface of the resin molding, within the mold cavity formed by the male mold and the female mold,
   wherein a groove portion of 0.3 to 1 mm width (W) is formed at a peripheral edge of the mold main body corresponding to the coated surface side of the resin molding, and
   wherein an angle ($\theta_1$) made by an inner circumferential surface of the mold main body and a mold-opening-side internal wall surface of the groove portion is in a range of 30° to 70°.

2. The mold for in-mold coating formation according to claim 1, wherein a depth (D) of the groove portion is in a range of 0.3 to 1 mm.

3. The mold for in-mold coating formation according to claim 1, wherein an angle ($\theta_2$) made by an inner circumferential surface of the mold main body and a mold-closing-side internal wall surface of the groove portion is in a range of 30° to 150°.

4. The mold for in-mold coating formation according to claim 2, wherein an angle ($\theta_2$) made by an inner circumferential surface of the mold main body and a mold-closing-side internal wall surface of the groove portion is in a range of 30° to 150°.

5. The mold for in-mold coating formation according to claim 1, wherein the mold main body further includes a mold for groove portion formation, and wherein the groove portion is formed by assembling the male mold and/or the female mold with the mold for groove portion formation.

6. The mold for in-mold coating formation according to claim 1, wherein the groove portion is formed in the male mold or the female mold.

7. A mold for in-mold coating formation, comprising:

a mold main body including a male mold and a female mold, both of which having no auxiliary cavity with a largest dimension extending in a mold closing direction and formed around a circumference thereof, which are clamped with each other with a mold cavity being formed therein to allow formation of a resin molding having a coated surface by means of injection molding; and a coating material injecting unit capable of injecting a coating material to an area corresponding to the coated surface of the resin molding, within the mold cavity formed by the male mold and the female mold, wherein a groove portion of 0.3 to 1 mm width (W) is formed at a peripheral edge of the mold main body corresponding to the coated surface side of the resin molding, and wherein a border portion between an inner circumferential surface of the mold main body and a mold-opening-side internal wall surface of the groove portion has an R-shaped form having a curvature radius (r) of 0.2 to 1 mm.

8. The mold for in-mold coating formation according to claim 7, wherein a depth (D) of the groove portion is in a range of 0.3 to 1 mm.

9. The mold for in-mold coating formation according to claim 7, wherein an angle ($\theta_2$) made by an inner circumferential surface of the mold main body and a mold-closing-side internal wall surface of the groove portion is in a range of 30° to 90°.

10. The mold for in-mold coating formation according to claim 8, wherein an angle ($\theta_2$) made by an inner circumferential surface of the mold main body and a mold-closing-side internal wall surface of the groove portion is in a range of 30° to 90°.

11. The mold for in-mold coating formation according to claim 7, wherein the mold main body further includes a mold for groove portion formation, and wherein the groove portion is formed by assembling the male mold and/or the female mold with the mold for groove portion formation.

12. The mold for in-mold coating formation according to claim 7, wherein the groove portion is formed in the male mold or the female mold.

* * * * *